United States Patent

[11] 3,563,184

| [72] | Inventor | John A. Angelbeck, Jr.<br>Chesterfield, Mo. |
|---|---|---|
| [21] | Appl. No. | 819,130 |
| [22] | Filed | Apr. 25, 1969 |
| [45] | Patented | Feb. 16, 1971 |
| [73] | Assignee | Pack-Rite Packaging & Crating Co., Inc.<br>a corporation of Missouri |

[54] PALLET
11 Claims, 7 Drawing Figs.

[52] U.S. Cl..................................................... 108/51,
108/53
[51] Int. Cl..................................................... B65d 19/18
[50] Field of Search........................................... 108/51-
—58; 211/71; 214/10.5

[56] References Cited
UNITED STATES PATENTS

| 2,463,214 | 3/1949 | Stoner............................ | 108/58X |
| 2,662,710 | 12/1953 | Lapham........................ | 108/52 |
| 2,991,965 | 7/1961 | Drieborg....................... | 108/58 |
| 3,140,672 | 7/1964 | DeLuca......................... | 108/58X |
| 3,187,691 | 6/1965 | Leitzel.......................... | 108/58 |
| 3,228,358 | 1/1966 | Sere et al....................... | 108/51 |
| 3,393,647 | 7/1968 | Howell.......................... | 108/52 |
| 3,424,110 | 1/1961 | Toot............................... | 108/53 |
| 3,467,032 | 9/1969 | Rowlands et al.............. | 108/51 |

*Primary Examiner*—Bobby R. Gay
*Assistant Examiner*—Glenn O. Finch
*Attorney*—Robert J. Schaap ABSTRACT: A pallet used for the storage and transporting of containers such as beer kegs and the like. The pallet is formed as a unitary plastic member in a rotational molding operation and includes a pair of spaced outer skins which are internally connected by a plurality of properly spaced webs for internal strength. The skins also have a plurality of strategically located apertures which extend through each of the skins. The pallet has a plurality of downwardly extending shoulders for engagement with containers on its underface and is also provided with supporting areas on its upwardly presented surface for removably supporting a plurality of like containers.

PATENTED FEB 16 1971　　3,563,184

INVENTOR
JOHN A. ANGELBECK, JR.
BY Robert J. Schaap
ATTORNEY

PALLET

This invention relates in general to certain new and useful improvements in pallets and, more particularly to pallets which are unitarily formed of a plastic material, for storing and transporting relatively large containers.

For many years it has been a widespread practice to use wooden pallets for the storage and transporting of large containers such as barrels, kegs and the like. The use of pallets formed of wood has been extant to a large degree in such industries as the beer industry where considerable movement of the beer kegs is a resultant facet of manufacturing and delivery.

However, there are a number of drawbacks to the use of wooden pallets, particularly in the realm of economics and practicality. From a practical standpoint, wooden pallets are quite difficult to maintain and after a period of time, are rendered ineffective for use when subject to normal abuse in the trade. Furthermore, where the wooden pallets are used in a normally humid atmosphere or in a location where they are subject to contact with liquid substances, the wood can rapidly deteriorate. From an economic standpoint, the wooden pallets have a shorter life than pallets formed of other materials and in addition are more costly in terms of purchase price than pallets formed of nonwooden materials.

There has been a recent introduction in the marketplace of pallets formed primarily of plastic materials. However, these pallets, like their wooden counterparts also suffer from a number of disadvantages. The plastic pallets thus far available, do not have sufficient internal strength inherent in their construction to withstand the abuse normally imposed on these devices. Furthermore, the presently employed processes for producing these pallets resulted in a substantial cost which did not afford any significant economic advantage over wooden pallets.

It is, therefore, the primary object of the present invention to provide a pallet for the storage and transporting of large containers, where the pallet is characterized by a unitary plastic construction.

It is another object of the present invention to provide a pallet of the type stated which is selectively provided with a plurality of strategically located internal webs to afford sufficient internal strength.

It is a further object of the present invention to provide a pallet of the type stated which is relatively rigid in its construction and which is relatively inexpensive to manufacture.

It is an additional object of the present invention to provide a pallet of the type stated which is capable of effectively competing with conventional wooden pallets.

It is also an object of the present invention to provide a pallet of the type stated which is capable of being used in a wide variety of conditions and which can be used for supporting a wide variety of types and sizes of containers.

With the above and other object in view, my invention resides in the novel features of form, construction, arrangement and combination of parts presently described and pointed out in the claims.

In the accompanying drawings (1 sheet):

Figure 4:
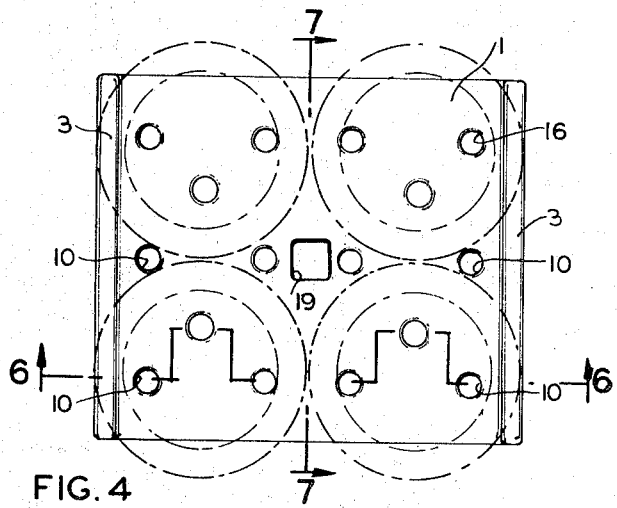
FIG. 4 is a top plan view of the pallet of FIG. 2.
Figure 3:
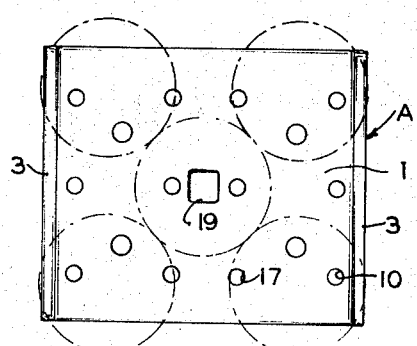
FIG. 3 is a side elevational view of the pallet of FIG. 2, the other side elevational view being substantially identical.
Figures 5, 8:
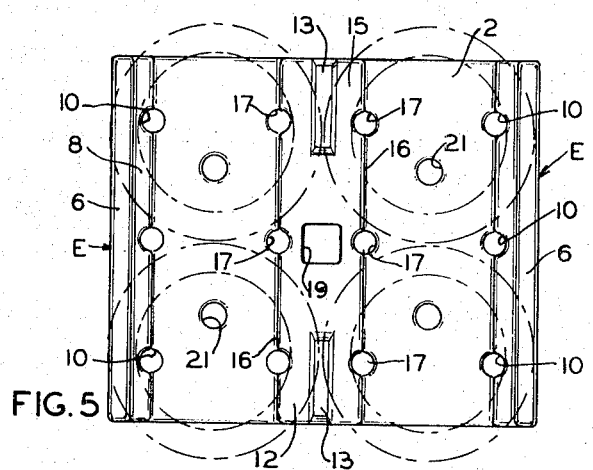
FIG. 5 is a bottom plan view of the pallet of FIG. 2, with a plurality of container positions being represented by dotted lines therein.
Figure 6:
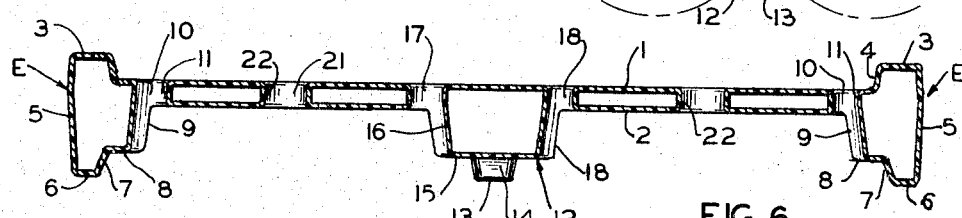
Figure 7:
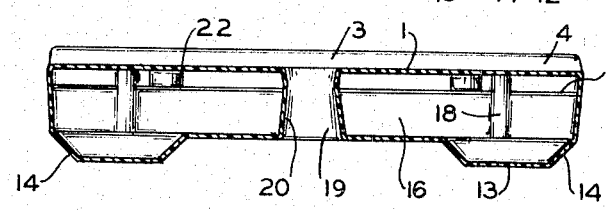

FIGS. 6 and 7 are vertical sectional views taken along lines 6–6 and 7–7 respectively of FIG. 4; and FIG. 8 is a top plan view of a pallet constructed in accordance with and embodying the present invention and showing five smaller sized container positions in dotted lines thereon.

Generally speaking, the present invention relates to a pallet which is entirely formed of a plastic or synthetic resinous material in a unitary structure. The pallet has spaced top and bottom walls with enlarged transverse and end sections. The end sections are provided with legs for supporting the pallet on the floor or similar supporting structure. A central support section is also provided midway between the two end sections, the central section also containing legs for engagement with the floor or similar supporting structure. In addition, the end sections and the central section have downwardly presented load-bearing shoulders for receiving the upper margins of containers disposed on a similar pallet therebeneath. The pallet is provided with strategically located apertures formed by webs which provide internal strength and rigidity.

Referring now in more detail and by reference characters to the drawings which illustrate a preferred embodiment of the present invention, A designates a pallet which is formed of unitary construction from a suitable plastic or synthetic resin material such as high density polyethylene. It has been found in connection with the present invention that rotational molding is one of the most effective molding techniques used in the formation of the pallets. While high density polyethylene has been found to be one of the most suitable materials used in the formation of the pallets, the invention is by no means limited to this particular material. Other materials which can be used in the formation of the pallets are polyvinyl chloride, polystyrene, polystyrene-butadiene copolymers, a number of other polyvinyl halide polymers and a number of acrylate and methacrylate copolymers, etc.

The pallet A is formed as an integral unit with a pair of essentially opposed and spaced sheets or so-called "skins" as illustrated in FIGS. 6 and 7. The pallet A generally comprises a relatively flat top wall 1 and spaced downwardly therefrom is an opposed relatively flat bottom wall 2. Integrally formed with the top wall 1 and bottom wall 2 are end sections E which extend along the transverse end of the top and bottom walls 1,2. The end sections E comprise a pair of transverse upwardly extending rectangular shoulders 3 which are integrally formed with the top wall 1 and have inwardly presented vertical abutment surfaces 4. Each of the shoulders 3 integrally merges into outwardly presented end walls 5 which in turn, merge into downwardly presented transversely extending base walls 6. Inwardly and upwardly extending inclined walls 7 are integrally formed with the base walls 6 and with downwardly presented load bearing shoulders 8. The load-bearing shoulders 8 are, in turn, connected to the bottom wall 2 by means of inwardly facing flat vertical walls 9.

It should be recognized that the end sections E serve as load bearing elements and are, therefore, formed with substantial thickness. The base walls 6 are designed to support the pallet A when placed directly on a floor or other supporting structure. Furthermore, the load-bearing shoulders 8 are designed to engage one or more barrels or similar containers C when the pallets are used in stacked relationship.

The pallet A is provided with three transversely aligned apertures 10 which are spaced inwardly from one of the abutment surfaces 4. In like manner, three transversely aligned apertures 10 are also located inwardly of the opposite abutment surface 4. The apertures 10 extend through the top and bottom walls 1,2 and through portions of the load bearing shoulders 8 and the flat walls 9. Each of the apertures 10 is surrounded and formed by circular webs 11 which extend between the two skins. Thus, by reference to FIG. 6, it can be seen that the webs 11 extend between the top and bottom walls 1,2 and between the top wall 1 and load bearing shoulders 8, as well as the flat walls 9.

Figure 1:
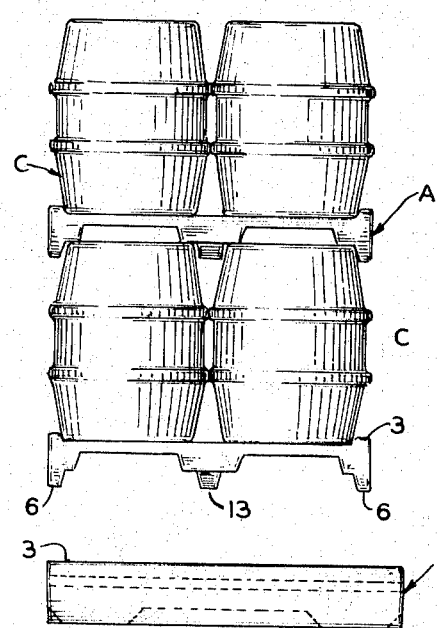
FIG. 1 is a front elevational view illustrating two pallets constructed in accordance with and embodying the present invention and used in stacked marginal registration with a plurality of conventional containers supported by said pallets.
Figure 2:
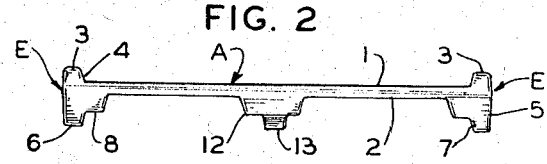
FIG. 2 is a front elevational view of a pallet constructed in accordance with and embodying the present invention.

Integrally formed with the bottom wall 2 somewhat centrally thereof, and extending downwardly therefrom is a transversely extending center support 12, which is more fully illustrated in FIGS. 1, 2, and 5. The center support 12 is integrally provided with a pair of downwardly extending transverse support ribs 13 which extend inwardly from the forward and rearward margins of the bottom wall 2. By further reference to FIG. 7, it can be seen that the support ribs 13 each extend inwardly for a distance approximately one-fourth of the overall transverse dimension of the bottom wall 2. Furthermore, the support ribs 13 each have forward and rearward tapered end walls 14 which are inclined at about a 45° angle.

The center support 12 is also provided with spaced load bearing shoulders 15 on each side of the support ribs 13 and extend for substantially the entire transverse distance of the bottom wall 2. The shoulders 15 are integrally formed with outwardly facing vertical walls 16 which, in turn, merge into the bottom wall 2. It should be observed that the vertical walls 9 and 16 are slightly inclined inwardly at about a 10° angle of taper.

The pallet A is provided with two pairs of transversely aligned apertures 17 which are located along the transverse margins of the center support 12 so that the apertures extend through the top and bottom walls 1,2, the flat vertical walls 16 and the load bearing shoulders 15. Each of the apertures 17 is surrounded by and formed by circular webs 18 which extend between the top and bottom walls 1,2 and between the bottom wall 2, the shoulders 15 and vertical walls 16. It should be observed that the portion of the apertures 17 extending through the walls 16 and the load bearing shoulders 15 are diametrally larger than the portion of the apertures 17 extending through the top and bottom walls 1,2. Furthermore, the webs 18 which form the apertures 17 have slightly inclined walls with a downwardly and outwardly presented taper.

The pallet A is also provided with a large central aperture 19 which extends through the top and bottom walls 1,2 and through the lower wall of the center support 12. The portion of the aperture 19 extending through the center support 12 is substantially larger than the portion of the aperture 19 extending through the top and bottom walls 1,2. The aperture 19 is also formed by and surrounded by a circular web 20. The portion of the web 20 located in the region of the center support has downwardly and outwardly inclined walls with an angle of taper of approximately 10°.

Spaced approximately midway between the transversely extending rows of apertures 10 and 17 on each side of a transverse centerline of the pallet A are additional rows of two transversely aligned apertures 21. The apertures 21 extend through the top and bottom walls 1,2 and are surrounded by and formed by circular webs 22.

Each of the aforementioned apertures in the pallet A have rounded corners where they are formed in the various components. Furthermore, the various apertures are so located in strategic positions so that containers supported on the pallet A contact load bearing surfaces of the pallet A which are reinforced by the various webs. In essence, the various webs extending through the two skins form a type of honeycomb structure providing sufficient internal strength and rigidity. By reference to FIG. 1, it can be seen that the pallets can be used in a stacked structure arrangement to support a number of levels or tiers of containers C. Four such containers can be placed on the top wall 1 in substantially the location illustrated in FIG. 4. The lower pallet A would be located on the floor or other supporting structure and would rest on the base walls 6 and the support ribs 13.

Other pallets A supporting containers C can be stacked on similar containers C supported on a like pallet A disposed beneath and in marginal registration with the first named pallet A. A second pallet A can be disposed above and in supportive engagement with the containers C on the lower pallet A. The upper margins of the containers C would bear against the load bearing shoulders 8 and 15 of the upper pallet A. Furthermore, it should be observed that the apertures and webs located in these shoulders are so located that the portions of the pallet absorbing the stress imposed have sufficient internal strength and rigidity.

This type of supporting arrangement enables the skids of a fork lift truck or similar vehicle (not shown) to be engageable with the underside of the bottom wall 2 of a pallet A without disturbing the containers C on the pallet A therebeneath. It can be observed that there is sufficient clearance between the upper margins of the containers which engage the load bearing shoulders 8, 15 of a pallet A disposed thereabove and the underside of the bottom wall 2 of this pallet A.

FIG. 8 illustrates an arrangement where five containers C' can be supported on the top wall 1 of a pallet A. The containers C' have a smaller diametral size than the containers C and five of these containers C' can be conveniently supported on the top wall 1 whereas four of the larger containers C can be supported on the top wall 1. It is to be noted that the pallets could be used in a stacking arrangement with the containers C' in the same manner as with the containers C. Where the five containers C' are located in the positions substantially as illustrated in FIG. 8, the upper margins of these containers would engage the load bearing shoulders 8, 15 of a pallet disposed immediately thereabove. The upper margins of the four containers C' located along the periphery of the pallet A would engage both the load bearing shoulders 8 and 15 of a pallet disposed immediately thereabove. However, the container C' located on the center of the top wall 1 would engage both of the opposed load bearing shoulders 15 of the pallet A disposed immediately thereabove.

While the pallet A of the present invention has been illustrated for use with a plurality of barrel type containers, it should be recognized that the pallet A could be used with containers having different sizes and shapes, as well as with other types of load bearing structures.

It should be understood that changes and modifications in the form, construction, arrangement and combination of parts presently described and pointed out may be made and substituted for those herein shown without departing from the nature and principle of my invention.

I claim:

1. A load-carrying pallet formed substantially of a plastic material as a substantially integral structure and comprising:
    a. a top wall adapted to receive load bearing structures thereon;
    b. a bottom wall disposed beneath and spaced from said top wall;
    c. identical end sections located along and integrally formed with the two opposed transverse margins of said top and bottom walls, each of said end sections comprising;
        1. an upstanding shoulder;
        2. an interiorly presented abutment surface;
        3. an outwardly presented end wall;
        4. a floor engageable base wall integrally connected to said end wall;
        5. an inwardly and upwardly extending inclined wall;
        6. a downwardly presented load-bearing shoulder; and
        7. and a relatively flat vertical wall connecting said shoulder and said bottom wall;
    d. a center support section located substantially midway between said end sections, said center support section comprising;
        1. a downwardly extending member;
        2. a pair of spaced transversely extending load-bearing shoulders on said downwardly extending member and extending for the entire transverse dimension of said top wall;
        3. the load-bearing shoulders on said center support section being located in the same horizontal plane with and cooperating with the load-bearing shoulders on said end sections; and
        4. a pair of opposed downwardly extending floor-engaging members extending from the longitudinal margins of said top wall and each of said members extending inwardly for approximately one-fourth the overall transverse dimension of said top wall;
    e. a first row of spaced transversely aligned apertures extending through said top wall and through the shoulders on one of said end sections;
    f. a web surrounding each of said last named apertures and extending between said top wall and said last named load-bearing shoulders;

g. a second row of spaced transversely aligned apertures extending through said top wall and the shoulders on the other of said end sections;
h. a web surrounding each of said last named apertures and extending between said top wall and said last named load-bearing shoulders;
i. an enlarged aperture located substantially in the center of said top wall and extending through said top wall and said center section;
j. a web surrounding said enlarged aperture and extending between said top wall and said center section, the portion of the web extending through said center section having a downwardly and outwardly tapering sidewall;
k. third and fourth rows of spaced transversely aligned apertures located along the transverse margins of said center section and extending through said top wall and the load-bearing shoulders on said center section; and
l. a web surrounding each of said last named apertures and extending between said top wall and said load-bearing shoulders.

2. A load-carrying pallet formed substantially of a plastic material as a substantially integral structure and comprising a first surface for receiving a plurality of load-bearing structures thereon, a second surface disposed beneath said first surface, first and second enlarged sections connecting said first and second surfaces, said enlarged section being located in proximate relation to at least one margin of said surfaces, an intermediate section located between said first and second sections, floor engageable elements depending from said first and second sections and each said floor engageable element having a base wall spaced from said second surface, load-bearing shoulders on said first and second sections and being located intermediate said second wall and base walls, cooperating load-bearing shoulders on said intermediate section and being substantially coplanar with and cooperating with the load-bearing shoulders on said first and second sections to support the weight of the pallet when such shoulders are engaged by supportive elements of an item disposed beneath the pallet, and weblike elements extending between said first and second surfaces to integrally join said first and second sections.

3. The pallet of claim 2 further characterized in that at least one aperture extends through said first surface and one of said load-bearing shoulders on one of said enlarged sections and at least one other aperture extends through said first surface and the load-bearing shoulder on the other of said enlarged sections, and that a web surrounds said apertures and extends between said first surface and said load-bearing shoulders.

4. A load-carrying pallet formed substantially of a plastic material as a substantially integral structure and comprising a first surface for receiving load-bearing structures thereon, a second surface disposed beneath said first surface, first and second enlarged sections located along two opposed margins of said first and second surfaces and connecting said first and second surfaces, an intermediate section located approximately midway between said first and second enlarged sections, floor engageable elements integrally formed with said first and second sections, a pair of opposed floor engageable elements integrally formed with said intermediate section and extending inwardly from a pair of opposed margins of said first and second surfaces, each of said last-named floor engageable elements extending inwardly for approximately one-fourth the overall dimension between said opposed margins, load-bearing shoulders on said first and second sections, a plurality of load-bearing shoulders on said intermediate section and cooperating with the load-bearing shoulders on said first and second sections, three apertures extending through said first surface and one of said load-bearing shoulders on one of said enlarged sections and three other apertures extending through said first surface and the load-bearing shoulder on the other of said enlarged sections, a web surrounding said apertures and extending between said first surface and said load-bearing shoulders, at least one additional aperture extending through said first surface and said intermediate section, and a web surrounding said last-named aperture and extending between said first surface and the load-bearing shoulders on said intermediate section.

5. The pallet of claim 4 further characterized in that said additional aperture is located approximately in the center of said first surface and extends through said first surface and said intermediate section, and that the portion of the web extending through said intermediate section has a downwardly and outwardly tapering sidewall.

6. A load-carrying pallet formed substantially of a plastic material as a substantially integral structure and comprising a first surface for receiving a plurality of load-bearing structures thereon, a second surface disposed beneath said first surface, first and second enlarged sections located along two opposed margins of said first and second surfaces and connecting said first and second surfaces, an intermediate section located approximately midway between said first and second enlarged sections, floor engageable elements integrally formed with said first and second sections and said intermediate section, load-bearing shoulders on said first and second sections, a plurality of load-bearing shoulders on said intermediate section and cooperating with the load-bearing shoulders on said first and second sections, at least one aperture extending through said first surface and one of said load-bearing shoulders on one of said enlarged sections and at least one other aperture extending through said first surface and the load-bearing shoulder on the other of said enlarged sections, a web surrounding said apertures and extending between said first surface and said load-bearing shoulders, at least one additional aperture extending through said first surface and said intermediate section, and a web surrounding said last-named aperture and extending between said first surface and the load-bearing shoulders on said intermediate section, the load-bearing shoulders on the first and second sections of the like pallet disposed thereabove and the cooperating load-bearing shoulders on the intermediate section of said like pallet being sized and located to receive the upper margins of said load-bearing structures, said load-bearing shoulders of said pallets being spaced sufficiently beneath said second surface to receive lift forks engageable with the underside of said second surface.

7. A load-carrying pallet formed substantially of a plastic material as a substantially integral structure and comprising a first surface for receiving load-bearing structures thereon, a second surface disposed beneath said first surface, first and second enlarged sections connecting said first and second surfaces, said enlarged sections being located in proximate relation to at least one margin of said surfaces, an intermediate section located between said first and second sections, floor engageable elements depending from said first and second sections, load-bearing shoulders on said first and second sections, cooperating load bearing shoulders on said intermediate section and cooperating with the load-bearing shoulders on said first and second sections, and weblike elements extending between said first and second surfaces to integrally join said first and second sections, the load-bearing shoulders on the first and second sections of a like pallet disposed thereabove and the cooperating load bearing shoulders on the intermediate section of said like pallet being sized and located to receive the upper margins of said load-bearing structures, said load-bearing shoulders of said pallets being spaced sufficiently beneath said second surface to receive lift forks engageable with the underside of said second surface.

8. The pallet of claim 7 further characterized in that an aperture extends through said first and second surfaces in the region of each of said webs in such manner that each web forms such aperture.

9. A load-carrying pallet formed substantially of a plastic material as a substantially integral structure and comprising a first surface for receiving load-bearing structures thereon, a second surface disposed beneath said first surface, first and second enlarged sections located along two opposed margins of said first and second surfaces and connecting said first and second surfaces, an intermediate section located approximately midway between said first and second enlarged sections, floor engageable elements integrally formed with said first and second sections and said intermediate section, load-bearing shoulders on said first and second sections, a plurality of load-bearing shoulders on said intermediate section and cooperating with and being substantially coplanar with the load-bearing shoulders on said first and second sections, at least one aperture extending through said first surface and one of said load-bearing shoulders on one of said enlarged sections and at least one other aperture extending through said first surface and the load-bearing shoulder on the other of said enlarged sections, a web surrounding said apertures and extending between said first surface and said load-bearing shoulders, at least one additional aperture extending through said first surface and said intermediate section, and a web surrounding said last-named aperture and extending between said first surface and the load-bearing shoulders on said intermediate section.

10. A load-carrying pallet formed substantially of a plastic material as a substantially integral structure and comprising a first surface adapted to receive load-bearing structures thereon, a second surface disposed beneath said first surface, first and second enlarged sections operatively associated with said first and second surfaces in proximate relation to at least one margin of said surfaces and providing operative attachment between said first and second surfaces, an intermediate section located between said first and second sections, floor engageable elements operatively associated with said first and second sections, load-bearing shoulders operatively associated with said first and second sections, cooperating load-bearing shoulders operatively associated with said intermediate section and cooperating with the load-bearing shoulders associated with said first and second sections, and somewhat cylindrical weblike elements extending between said first and second surfaces and being integrally formed with said first and second surfaces to integrally join said first and second sections, said weblike elements forming an aperture extending between said first and second surfaces.

11. A double-skinned pallet formed from plastics material and comprising:
   a. an upper wall;
   b. a lower wall;
   c. a plurality of webs extending between said walls and being integrally formed with each of said walls providing apertures within said pallet;
   d. said webs being somewhat cylindrical in shape so as to provide internal strength and to maintain spacial relation between said two walls;
   e. a peripheral wall extending around the extreme peripheries of the upper and lower walls to support said peripheries; and
   f. said peripheral wall being integrally formed with the upper and lower walls.

Notice of Adverse Decision in Interference

In Interference No. 98,108 involving Patent No. 3,563,184, J. A. Angelbeck, Jr., PALLET, final judgment adverse to the patentee was rendered Oct. 17, 1973, as to claim 11.

[*Official Gazette February 26, 1974.*]